Lamb & Root.
Wheel.
Nº 7874. Patented Jan. 1, 1851.
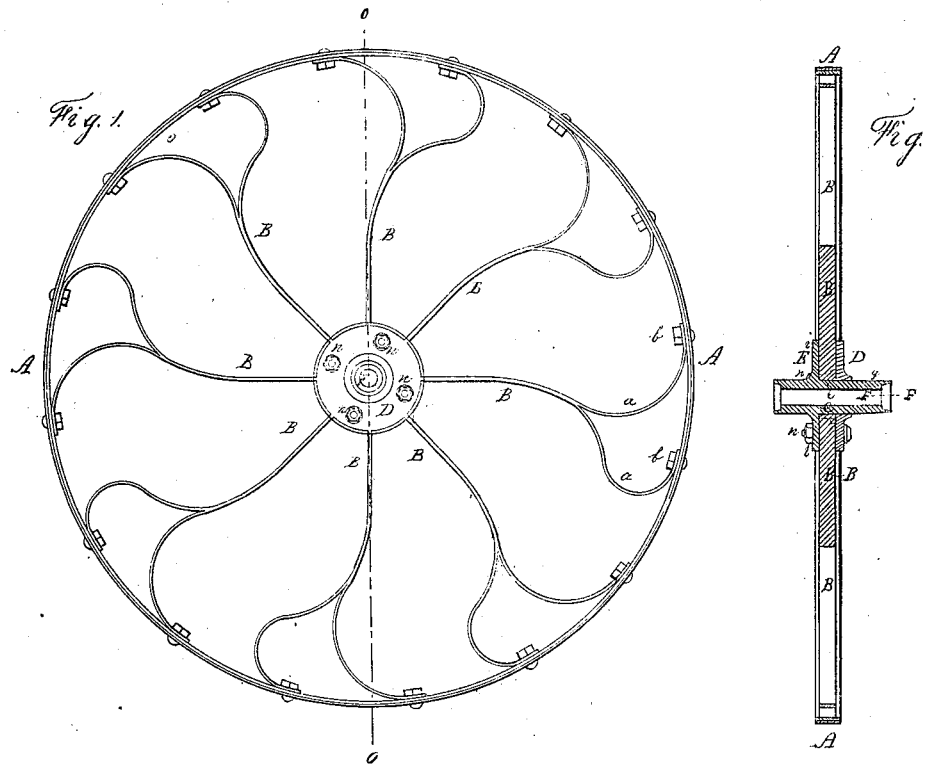
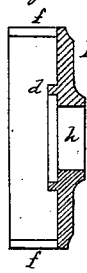
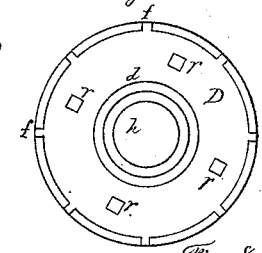
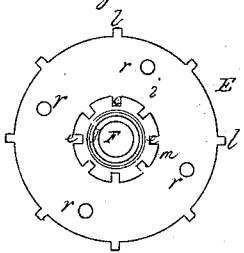
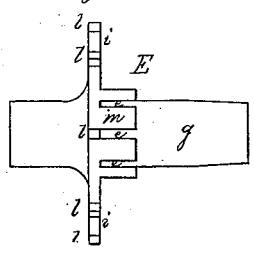

UNITED STATES PATENT OFFICE.

JOHN LAMB AND CHAS. H. ROOT, OF McDONOUGH, NEW YORK.

SPRING CARRIAGE-WHEELS.

Specification of Letters Patent No. 7,874, dated January 1, 1851.

*To all whom it may concern:*

Be it known that we, J. Lamb and C. H. Root, of McDonough, in the county of Chenango and State of New York, have invented a new and useful Carriage-Wheel; and we do hereby declare that the following is a full, clear, and exact description of the construction and operation of the same, reference being had to the accompanying drawings, forming a part of this specification, in which—

Figure 1 is a side or front elevation. Fig. 2 is a transverse section through the line $o, o$, of Fig. 1. Figs. 3, 4, 5, 6, 7, and 8, are detached parts on an enlarged scale in detail. Figs. 3 and 4, are side and edge views of the spokes, being broken off or shown only in part. Fig. 5 is a transverse section of the hub or nave. Fig. 6 is a front or side view of the hub. Fig. 7 is a side view of the box. Fig. 8 is a longitudinal or edge view of the axle box.

The same letters of reference indicate the same parts in each of the several figures.

The nature of our invention consists in the use of curved flat steel spokes secured to the rim of the wheel at two points, each spoke, and resting on the hub or nave through slots in the edge of the hub, with grooves or notches at their extremities overlapping an annular projection in the hub and further secured by the axle-box, which has grooves into which the ends of the spokes fit and butt up against, the axle box being secured to the hub by bolts and projections on the edge of the plate covering the hub which fits into the slots formed for the spokes and serving to keep the spokes in their places.

To enable others skilled in the art to make and use our invention we will proceed to describe its construction and operation.

A, A, is the outside rim of the wheel, being made of cast steel or wrought steel, and forming two hoops one outside the other.

B, B, B, B, B, B, B, B, are the spokes made of flat steel and split or divided near their outer extremities into two pieces each spoke, which pieces are curved as at $a, a$, Fig. 1, and secured to the rim by bolts or rivets as at $b, b$, Fig. 1. Near the inner extremity of each spoke is a notch or groove on its edge $c$, Figs. 3, and 4, which laps over an annular projection $d$, Figs. 5 and 6; on the hub D, which partly serves to keep the spokes in their place, the extremity of the spoke or spokes also butting up against the axle box at $e, e, e$, Figs. 2, 7, and 8.

D, is the hub of metal and having grooves or slots $f, f, f$, through which the spokes pass and an annular ring $d$, as already described.

E, is the axle box, the part $g$, passing through the central opening $h$, of the hub or nave D, Figs. 5, and 6, the axle box is in form a round pipe, having on it or around it a plate $i, i$, which covers one side of the hub entering within the hub and having projections from its circumference $l, l, l, l, l$, which fill up the space in the hub slots $f, f, f$, left by the spokes, and serving to keep the spokes steady.

$m$, is a projecting ring cast to the axle box E butting up against the inside surface of the hub and having grooves or notches as at $e, e, e$, in number according to the spokes there being the same number of projecting pieces $l, l, l$, and slots in the hub $f, f, f$, as shown in Figs. 6, and 7, the grooves or notches $e, e, e$, brace or lap on either side the ends of the spokes.

$n, n, n, n$, are bolts and nuts for holding the hub and axle box together.

$r, r, r, r$, are the bolt holes for $n, n, n, n$.

F, is the axle bearing or passage.

The operation is as follows: The wheel revolving in the usual manner, at F, the pressure or weight of the vehicle is sustained on the rim and spokes B, B, B, B, B, B, B, B, which have their bearing against the annular ring $d$, of the hub at the point $c$, and against the base of the grooves or notches $e, e, e$, of the axle box, an elasticity being given to the spokes and easier motion to the carriage by their formation of steel splits divided and curved as at $a, a$, Fig. 1 and secured as at $b, b$, Fig. 1.

What we claim as our invention and desire to secure by Letters Patent, is—

The construction of the spokes B, B, B, B, B, B, B, B, of flat steel, split or divided and curved as at $a, a$, and secured as at $b, b$, Fig. 1, for the purpose and in the manner herein shown.

JOHN LAMB.
CHARLES H. ROOT.

Witnesses:
John Jewel,
George A. Lamb.